J. E. REEVES.
Extension-Joint for Carriage-Tops.
No. 214,193. Patented April 8, 1879.
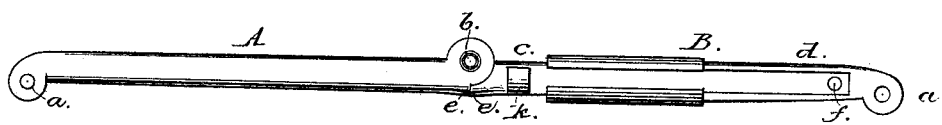
Fig. 1.
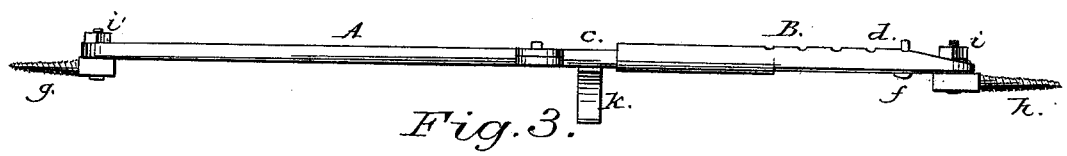
Fig. 3.
Fig. 2.
Witnesses:
Inventor:
James E. Reeves
by Parker H. Sweet Jr. & Co. att'ys

UNITED STATES PATENT OFFICE.

JAMES E. REEVES, OF ST. JOSEPH, MISSOURI.

IMPROVEMENT IN EXTENSION-JOINTS FOR CARRIAGE-TOPS.

Specification forming part of Letters Patent No. 214,193, dated April 8, 1879; application filed September 9, 1878.

*To all whom it may concern:*

Be it known that I, JAMES E. REEVES, of St. Joseph, in the county of Buchanan and State of Missouri, have invented a certain new and useful Improvement in Extension-Joints for Carriage-Tops; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

My invention is an improvement in braces for buggy-tops; and consists, first, of a rigid arm hinged or jointed to an extensible arm composed of two pieces, the one provided with an eye and shoulder, and having convex surfaces which are clasped by a sleeve formed on the other, fashioned after the manner of a dovetail to hold said first piece in a true line as said arm is extended or contracted in its length, and held at given points by pins provided for the purpose.

In my drawings, Figure 1 is a side, and Fig. 3 is an edge, view of my brace, showing its general construction. Fig. 2 is a transverse sectional view of the extensible arm.

Similar reference-letters indicate like parts in all of the figures.

Referring to the drawings, A is the joint, formed of a single piece provided with eyes $a$ $b$. B is the extensible arm, composed of two pieces, $c$ $d$, sliding the one into the other. The extensible joint is fashioned as shown in the sectional view, with the part $d$ provided with a concave or dovetail groove formed to receive the part $c$, correspondingly formed. The extensible joint B, like the rigid joint A, is provided with eyes $a$ $b$. The arms A B have enlargements at their eyes $a$ $b$, which, together with suitable rivets or bolts, form the hinge-joint which connects the two arms together.

Shoulders $e$ $e$ are formed in the two arms to serve as abutments for each other when in juxtaposition. A pin, $f$, passes through the holes in the two pieces composing the extensible arm to hold them in given positions with reference to each other. The outside ends of the arms A B are provided with gimlet-pointed screws $g$ $h$, secured to said arms by screw-bolts and nuts $i$ $i'$. These gimlet-screws are fixed in the two rear bows of the vehicle-top, to hold the joints firmly in position when thrown up and braced, while the bolts which secure them serve as axes about which the arms A B move when the joints are relaxed.

My device is applicable to the inside of running-vehicle tops, convenient to the occupants of the vehicle, who, by seizing hold of the projection or hook $k$, are enabled to set or release the top with but slight inconvenience.

In my patent of November 27, 1877, No. 197,666, is shown an extensible arm composed of two pieces, the movable one of which has fixed upon it a loop which clasps its fellow, but does not afford the continuous bearing in its adjustment which I claim in my present application.

Having thus described my invention, what I claim as new, and desire to secure by Letters Patent, is—

The brace for vehicle-tops, composed of arms A B, the latter being formed of two pieces, $c$ $d$, the one convex or beveled in transverse section to slide into the other, correspondingly formed, by which construction the brace may be adjusted to suit tops of different sizes, as described.

In testimony that I claim the foregoing as my own invention I affix my signature in presence of two witnesses.

JAMES E. REEVES.

Witnesses:
LANSDALE FOX,
B. B. MANN.